(12) United States Patent
Figura et al.

(10) Patent No.: US 11,117,613 B2
(45) Date of Patent: Sep. 14, 2021

(54) STEERING ASSIST APPARATUS FOR A MOTOR VEHICLE

(71) Applicant: FORD GLOBAL TECHNOLOGIES, LLC, Dearborn, MI (US)

(72) Inventors: Michael Georg Figura, Dormagen NRW (DE); Alexander Ein Waldt, Cologne NRW (DE); Armin Schymczyk, Solingen NRW (DE)

(73) Assignee: Ford Global Technologies, LLC, Dearborn, MI (US)

(*) Notice: Subject to any disclaimer, the term of this patent is extended or adjusted under 35 U.S.C. 154(b) by 318 days.

(21) Appl. No.: 16/247,830

(22) Filed: Jan. 15, 2019

(65) Prior Publication Data

US 2019/0217882 A1 Jul. 18, 2019

(30) Foreign Application Priority Data

Jan. 15, 2018 (DE) .................... 10 2018 200 522.2

(51) Int. Cl.
*B62D 5/04* (2006.01)

(52) U.S. Cl.
CPC ......... *B62D 5/0463* (2013.01); *B62D 5/0403* (2013.01); *B62D 5/0415* (2013.01); *B62D 5/0481* (2013.01)

(58) Field of Classification Search
CPC .. B62D 5/0463; B62D 5/0403; B62D 5/0415; B62D 5/0481
See application file for complete search history.

(56) References Cited

U.S. PATENT DOCUMENTS

| 6,273,211 | B1 | 8/2001 | Engels et al. | |
| 6,834,261 | B1 | 12/2004 | Andonian | |
| 2016/0036296 | A1* | 2/2016 | Kabune | H02K 11/21 180/446 |
| 2016/0141936 | A1 | 5/2016 | Terauchi | |
| 2018/0304921 | A1* | 10/2018 | Hirate | B62D 15/025 |
| 2018/0304922 | A1* | 10/2018 | Hirate | B62D 5/008 |

FOREIGN PATENT DOCUMENTS

| DE | 10230347 A1 | 1/2004 |
| DE | 102010049999 A1 | 5/2012 |
| EP | 0125918 A2 | 11/1984 |
| JP | 2009241787 A * | 10/2009 |
| JP | 2009241787 A | 10/2009 |
| WO | 9812097 A1 | 3/1998 |

OTHER PUBLICATIONS

DE Examination Report DE 10 2018 200 522.2 Filed Feb. 27, 2019. 4 pages.
Mag the Magazine by ebmpapst. Audi A4: The adaptive steering. Mar. 2009 https://mag.ebmpapst.com/en/industries/automotive/audi-a4-the-adaptive-steering_1321/.

* cited by examiner

*Primary Examiner* — Kevin Hurley
*Assistant Examiner* — Marlon A Arce
(74) *Attorney, Agent, or Firm* — Raymond L. Coppiellie; Brooks Kushman P.C.

(57) ABSTRACT

A power assist device for supporting steering of a motor vehicle includes a steering column shaft and a housing. The shaft has a rotor and the housing has a stator. The stator is arranged in the radial direction with respect to the rotor. The rotor is a disk, and at least one magnet is arranged on the radially outer edge of said rotor.

2 Claims, 2 Drawing Sheets

STEERING ASSIST APPARATUS FOR A MOTOR VEHICLE

CROSS-REFERENCE TO RELATED APPLICATIONS

This application claims foreign priority benefits under 35 U.S.C. § 119(a)-(d) to DE Application 10 2018 200 522.2 filed Jan. 15, 2018, which is hereby incorporated by reference in its entirety.

TECHNICAL FIELD

The present invention relates to a power assist apparatus for supporting steering of a motor vehicle.

BACKGROUND

Numerous power assist systems in different embodiments are disclosed in the prior art. Meanwhile, electrically-supported power assist systems, also known as EPAS (electric power assist steering), are an essential component of a modern motor vehicle. In this case, the power assist systems may be designed to operate in an adaptive manner in order, inter alia, to ensure that the steering is assisted to a greater extent during a parking procedure, whilst in the case of a higher driving speed the steering is assisted to a lesser extent in order to prevent oversteer. In this case, the electric or electromechanical steering column-based power assist systems typically comprise an electric motor that is arranged adjacent to the steering column and that transfers a force via a gearing system to the steering column. This type of power assist systems comprises a construction-dependent comparatively high friction with a high degree of susceptibility with respect to external influences such as temperature and air moisture on account of the use of a transmission gearing.

A power assist system without a gearing system is disclosed in EP 0 125 918 A2. EP 0 125 918 A2 discloses an electrically-supported power assist system having an induction motor that is arranged on the steering column of a motor vehicle. The induction motor is a disk motor having windings that are supplied with current in an alternating manner depending upon the control of the driver.

SUMMARY

The disclosed apparatus provides a power assist device for supporting steering of a motor vehicle. The power assist apparatus comprises a steering column and a power assist device housing, wherein the steering column comprises at least one shaft. The shaft comprises a rotor and the power assist device housing comprises a stator. In the power assist apparatus in accordance with the invention the stator is arranged in the radial direction with respect to the rotor. In this case, the rotor is a disk, at least one magnet being arranged on the radial outer edge of said rotor. The arrangement that is provided is particularly compact and provides a translation that comprises a transmission of force of by way of example 50 Nm, in particular 20-60 Nm. Moreover, the mass is distributed symmetrically about the steering axis with the result that a mass imbalance caused by an additional drive motor offset from the axis is omitted. In particular, by means of the construction of the present invention the noise characteristics are improved in the case of maximum steering assist torque.

In accordance with one embodiment disclosed herein, the power assist apparatus comprises a circuit board that comprises an electronic control unit. In this case, the circuit board is arranged radially around the steering column. In particular the spacings between the individual electrical components on the one side and the associated mechanical components on the other side are short. The radial arrangement of the circuit board leads to an elimination or at least a reduction in wiring and plug connections. The operational reliability is thereby increased and the production costs are reduced. In a further embodiment, the circuit board comprises an axial spacing with respect to the rotor, said spacing being smaller than the rotor radius. The arrangement of the circuit board particularly close to the rotor leads to a particularly compact construction.

In accordance with a further embodiment, the steering column of the present invention comprises an upper shaft and a lower shaft mechanically connected to one another. This mechanical connection ensures the motor vehicle may be controlled by the driver in the event of a failure of the power assist. In accordance with a further embodiment, the mechanical connection may be a torsion bar.

In accordance with a further embodiment, the power assist apparatus comprises a rotation measuring device. The rotation measuring device is operative to ascertain a steering torque that is applied to the steering column. The assumption of the function of a torque sensor by means of the rotation measuring device on the one hand leads to the fact that it is not necessary to provide a separate torque sensor and on the other hand leads to the fact that the torque sensor is integrated in the particularly compact construction. The rotation measuring device in accordance with a further embodiment comprises a measuring head that is arranged on the circuit board. Moreover, the rotation measuring device in accordance with a further embodiment comprises at least one sensor magnet that is arranged on the steering column.

In accordance with one embodiment, the rotation measuring device is embodied for the purpose of ascertaining a rotor position and/or a steering angle of the steering column. A separate rotation sensor and also a steering angle sensor may therefore be omitted, particularly as the rotor position and the steering angle are identical for all 360°. In accordance with a further embodiment, the rotation measuring device may be embodied for the purpose of ascertaining an absolute angular position of the steering column. The number of absolute rotations may be determined by means of the absolute steering angle sensor.

In accordance with a further embodiment, the circuit board comprises at least one FET (field effect transistor). This at least one FET is arranged radially outward on the circuit board with the result that the at least one FET is arranged near a winding so as to control this winding. This arrangement ensures a good electromagnetic compatibility and low resistance losses. Moreover, the possibility is provided for allocating an FET to each winding. The heat that is produced by the entire system may consequently be distributed in a particularly homogeneous manner on the entire circumference. A separate component is consequently not necessary to serve as a heat sink. In accordance with a further embodiment of the present invention, cooling ribs may be arranged on the outer side of the power assist apparatus housing so as to improve the dissipation of heat. In accordance with a further embodiment of the present invention, the cooling ribs of the power assist device housing may be arranged radially outward. The radial outer ends of the cooling ribs comprise by means of the radial arrangement a larger spacing with respect to one another with the result that a greater cooling effect is provided by means of this arrangement.

The disk thickness of the rotor is narrower in accordance with a further embodiment of the present invention than the length of the magnet that is arranged in the axial direction on the rotor. This arrangement reduces the mass of the entire power assist apparatus.

Furthermore, the present invention discloses a motor vehicle that is fitted with a power assist apparatus in accordance with the invention.

Further features, characteristics and advantages of the present invention are apparent in the following exemplary embodiment with reference to the present figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The power assist apparatus in accordance with the invention is described below with reference to an exemplary embodiment with the aid of the figures.

Figure 1:
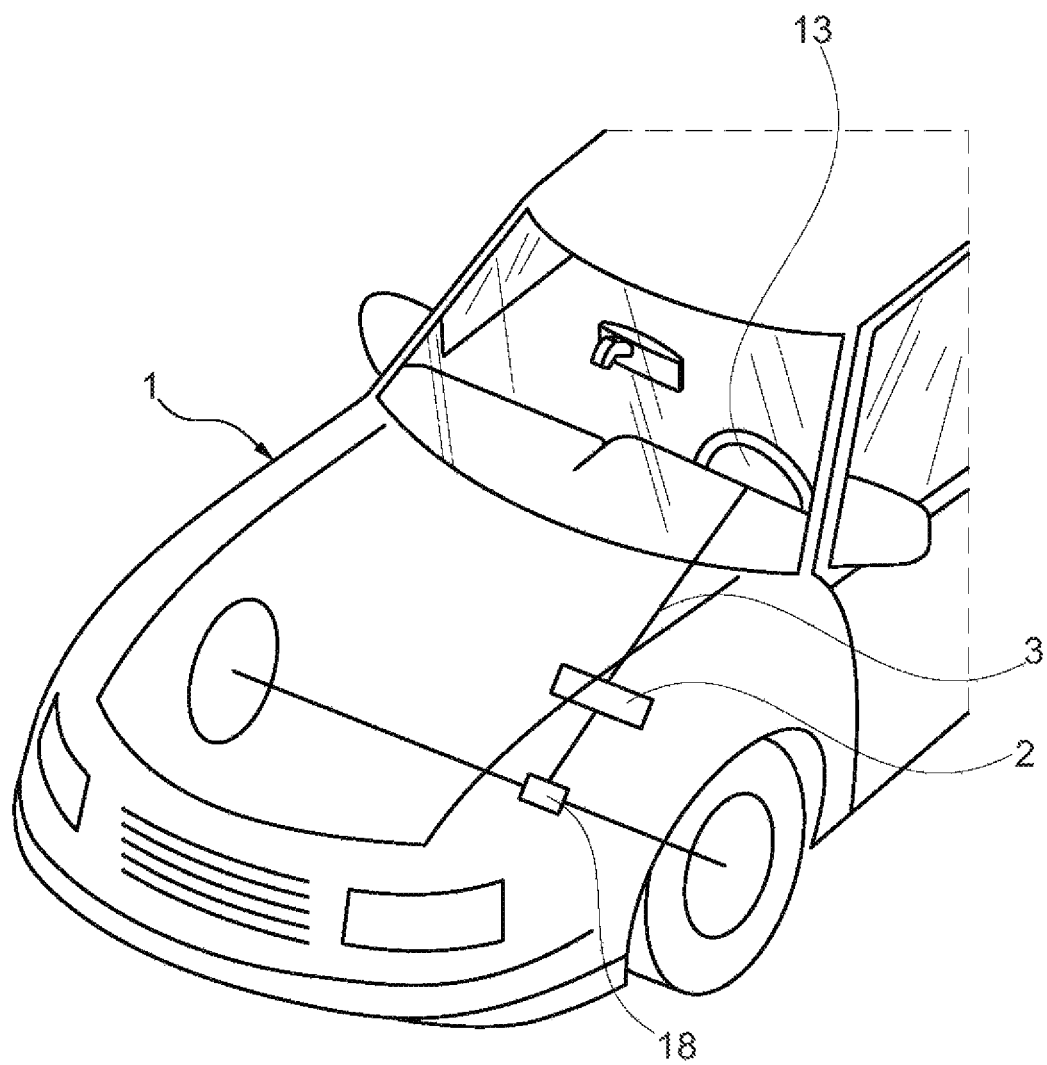
FIG. 1 illustrates a motor vehicle having a power assist apparatus in accordance with the invention.
Figure 2:
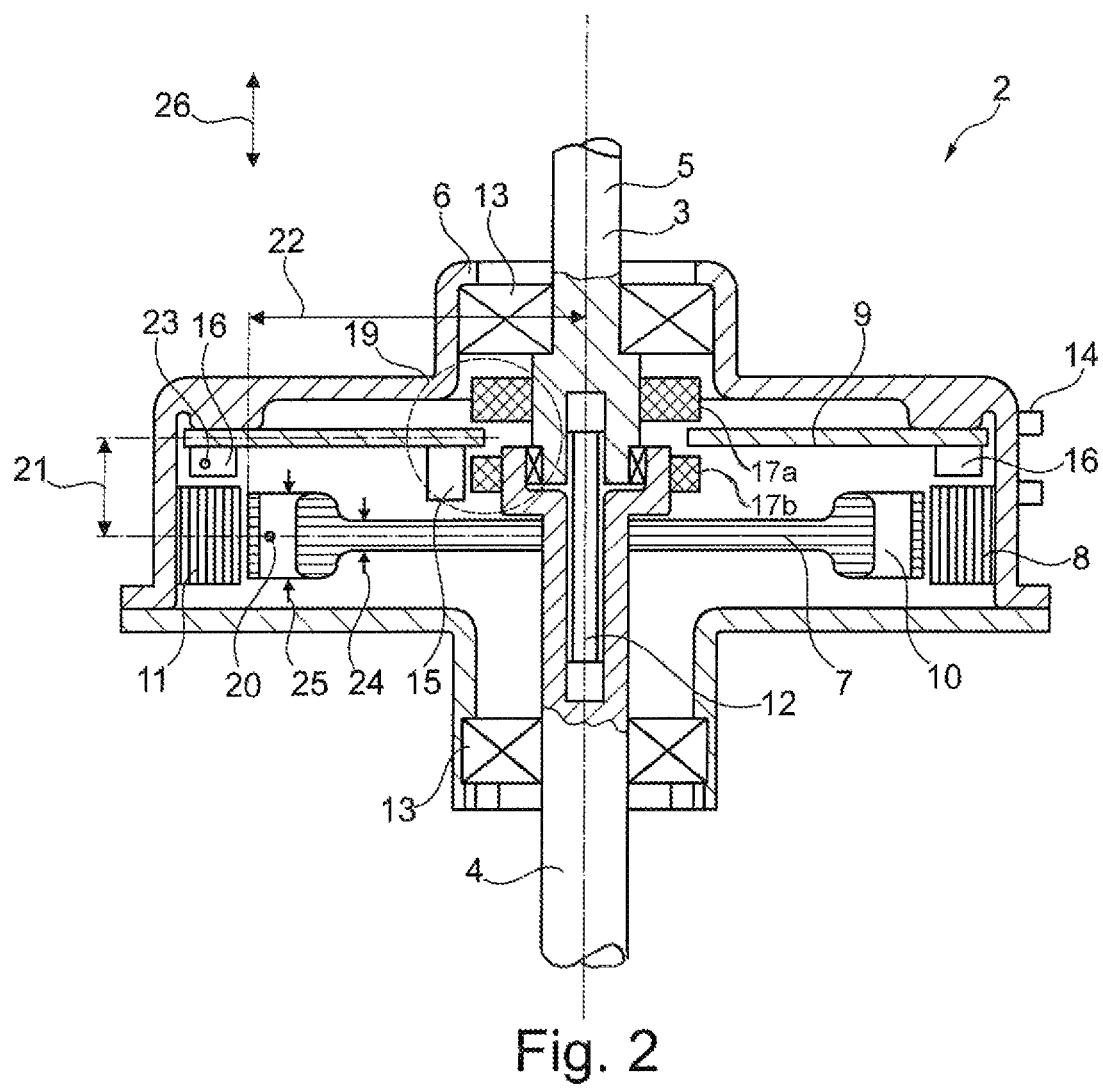
FIG. 2 illustrates an exemplary embodiment of a power assist apparatus in accordance with the invention.

The power assist device 2 illustrated in FIG. 2 provides power assistance to support manual steering inputs made by a driver (not shown) of a motor vehicle 1 (see FIG. 1). The power assist device 2 disclosed herein does not comprise a gearing system, as a result of which the disclosed apparatus may be embodied in a particularly compact manner. The omission of a gearing system reduces ambient noise such as for example flaps or transmission whines and decreases the sensitivity of the power assist device 2 to environmental influences such as temperature and air moisture. Moreover, signs of wear and tear in the disclosed apparatus are considerably reduced compared to in the case of a power assist device that is based on a gearing system.

The power assist device 2 comprises a power assist device housing 6 which radially surrounds a steering column 3. The housing 6 is fixed relative to the motor vehicle 1 and does not rotate along with the steering column 3. The steering column 3 comprises at least one shaft 4. In the present exemplary embodiment, the power assist device 2 comprises two segments, specifically a lower shaft 4 and an upper shaft 5, that are mechanically connected to one another. The mechanical connection provides the driver with the assurance that he/she is able to steer the motor vehicle 1 in an controlled manner despite a failure of the power assist device 2. Typically, this mechanical connection is a torsion bar 12 (see FIG. 2). In the present exemplary embodiment, the upper shaft 5 is connected to a steering wheel 13 of the motor vehicle 1 and the lower shaft 4 is connected to a steering gear 18 of the motor vehicle 1 (see FIG. 1).

The arrangement of the inner components of the power assist device 2 allows for the compact construction of the power assist device 2 in the axial direction 26. The power assist device 2 comprises a rotor 7 and a stator 8, which are arranged coaxially with respect to the steering column 3. In this case, the rotor 7 is a disk and is arranged in the present exemplary embodiment on the lower shaft 4. At least one magnet 10 is arranged on the radially outer edge 20 of the rotor 7. In the present exemplary embodiment, far more than ten magnets 10 may be arranged in the radially outer edge 20 of the rotor 7. The length 25 of the magnets 10 along the axial direction 26 is greater than the thickness 24 of the disk of the rotor 7. The thickness 24 of the disk of the rotor 7 may be kept small in order to keep the inert mass of the disk of the rotor 7 as small as possible.

The stator 8 is disposed on the housing 6 and radially outward with respect to the rotor 7 and comprises a plurality of windings 11. In the present exemplary embodiment, the stator 8 may comprise more than 27 windings 11 and is thereby able to electromechanically generate (in combination with the rotor 7, as is well known in the art) a steering assist torque approximately 10 to 15 times greater than in the case of power assist support motors of the type known in the prior art. Moreover, the coaxially symmetrical arrangement of the stator 8 and the rotor 7 with respect to the steering column 3 leads to a symmetrical distribution of the mass. A mass imbalance due to an external controlling motor for the power assist consequently does not occur.

The power assist device 2 further comprises at least one circuit board 9. In the present exemplary embodiment, the circuit board 9 is within and fastened to the housing 6, is constructed in an annular manner and is arranged coaxially with respect to the steering column 3. In this case, the circuit board 9 is arranged in a coaxial manner with respect to the rotor 7 in such a manner that the spacing 21 between the rotor 7 and the circuit board 9 is smaller than the radius 22 of the rotor 7.

The circuit board 9 comprises components allowing it to serve as an electronic control unit (ECU) operative to control the inner components of the power assist device 2. The circuit board/ECU 9 may be operative in either an open-loop or closed-loop manner. The integration of the entire ECU on the circuit board 9 is a further aspect that is intended to keep the power assist device 2 as compact as possible in the axial direction 26. In the exemplary embodiment, multiple field effect transistors (FETs) 16 are arranged radially outward 23 on the circuit board 9. This enables each winding 11 to be allocated an FET 16. In this layout, the individual FETs 16 may be placed near to the associated winding 11 in order to ensure an effective electromagnetic compatibility and low resistance losses. The heat that is produced may therefore be distributed in a homogenous manner over the entire circumference of the circuit board 9. A separate heat sink may consequently not be necessary. Moreover, each winding 11 may be allocated multiple FETs 16 with the result that a redundant arrangement is provided. In the event of a failure of one or multiple FETs 16, the power assist device 2 still functions sufficiently.

Cooling ribs 14 may be arranged as in the present exemplary embodiment radially outward on the power assist device housing 6 so as to increase the cooling power. An increased cooling effect may be achieved by means of the radial arrangement of the cooling ribs 14 since the spacings of the cooling ribs 14 with respect to one another are greater on the radial outer ends of the cooling ribs 14 than on the radial inner ends.

Moreover, the steering assist apparatus comprises a rotation measuring device 19. The rotation measuring device 19 is operative to ascertain a torque that is applied to the steering column 3. For this purpose, in the present exemplary embodiment the rotation measuring device 19 comprises a measuring head 15 that is arranged on the circuit board 9. The piece that mates with the measuring head 15 may be a sensor magnet 17 that is arranged on the steering column 3. In the present exemplary embodiment, two rings of sensor magnets 17*a*, 17*b* are arranged on the steering column 3, wherein the first ring of sensor magnets 17*a* is arranged on the upper shaft 5 and the second ring of sensor magnets 17*b* is arranged on the lower shaft 4. The measuring head 15 is arranged between the two rings of sensor magnets 17*a*, 17*b* in the axial direction 26. In the present exemplary embodiment, the measuring head 15 is a Hall probe that is operative to measure the magnetic field between the two rings of sensor magnets 17*a*, 17*b*. The relative rotation of the lower shaft 4 with respect to the upper shaft 5 may be determined from the measurement of the magnetic field by means of the control unit on the circuit board 9.

The circuit board/ECU 9 may then calculate the torque on the basis of the relative rotation of the two shafts with respect to one another in conjunction with the spring constant of the torsion bar 12. The measuring head 15, the rings of sensor magnets 17*a*, 17*b* and the control unit may therefore together be perceived as a torque sensor. A separate torque sensor that is provided as an additional component is therefore consequently not necessary. The integration of the torque sensor into the control unit of the circuit board 9 increases the operational security and reduces the production costs. The torque that is applied to the steering column 3 may be determined by means of the relative rotational movement of the two rings of sensor magnets 17*a*, 17*b* with respect to one another. Moreover, the rotation measuring device 19 simultaneously acts as a rotor position sensor. In addition to the rotor position, the steering angle may also be ascertained. Since the rotor position and the steering angle are identical for all 360°, neither a rotor position sensor nor a steering angle sensor is necessary. Furthermore, the rotation measuring device 19 comprises an absolute angle sensor that ascertains an absolute angular position of the steering column 3.

The present invention has been described in detail with reference to an exemplary embodiment for explanatory purposes. However, a person skilled in the art recognizes that deviations from the exemplary embodiment are possible. In the present exemplary embodiment, the rotor comprises 10 magnets and the stator comprises 27 windings. The number of magnets and the number of windings may vary with the result that the number of magnets may thus be greater or smaller than 10 and the number of windings may be greater or smaller than 27. Moreover, the cooling ribs that are arranged radially outward may be embodied and arranged differently on the power assist device housing. The invention is therefore not to be limited to the exemplary embodiment but rather only by the attached claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Steering assist apparatus for a motor vehicle, comprising:
a steering column comprising a lower shaft connected to a steering gear of the motor vehicle, and an upper shaft fixed to a steering wheel and mechanically connected to the lower shaft for rotation therewith;
a rotor mounted to the lower shaft for rotation therewith and comprising at least one magnet disposed around an outer circumference of the rotor;
a stator retained in a housing and comprising a plurality of windings disposed radially outward of the rotor;
a sensor including a first sensor magnet disposed on the upper shaft and a second sensor magnet disposed on the lower shaft, and operative to sense a torque applied to the upper shaft by rotation of the steering wheel and to measure a relative angular movement between the upper and lower shafts; and
an electronic control unit including a circuit board having at least one field effect transistor mounted in proximity to at least one of the plurality of windings, and operative to receive electrical signals from the sensor and, based at least partially thereupon, control an assist torque applied to the lower shaft by electromagnetic interaction between the rotor by the stator, wherein the circuit board is arranged radially around the steering column and spaced axially with respect to the stator, and wherein the sensor is a rotation measuring device including a measuring head arranged on the circuit board and operative to measure a magnetic field between the first and second sensor magnets.

2. Steering assist apparatus for a motor vehicle, comprising:
a steering column comprising a lower shaft connected to a steering gear of the motor vehicle, and an upper shaft fixed to a steering wheel and mechanically connected to the lower shaft for rotation therewith;
a rotor mounted to the lower shaft for rotation therewith and comprising a plurality of magnets disposed around an outer circumference of the rotor;
a stator retained in a housing and comprising a plurality of windings disposed radially outward of the rotor;
an annular circuit board arranged radially around the steering column;
at least one field effect transistor disposed on the circuit board and axially spaced from at least one of the plurality of windings;
a measuring head disposed on the circuit board and operative to sense a torque applied to the upper shaft by rotation of the steering wheel, the circuit board receiving electrical signals from the measuring head and operating in an open-loop to control an assist torque applied to the lower shaft by electromagnetic interaction between the rotor by the stator; and
a first sensor magnet disposed on the upper shaft and a second sensor magnet disposed on the lower shaft, the measuring head being operative to measure a magnetic field between the first and second sensor magnets.

\* \* \* \* \*